US005523682A

United States Patent [19]
Leon

[11] Patent Number: 5,523,682
[45] Date of Patent: * Jun. 4, 1996

[54] METHOD FOR DETERMINING POSITION OF AN INTERNAL, MOVABLE CONDUCTIVE ELEMENT

[75] Inventor: Robert L. Leon, Maple Glen, Pa.

[73] Assignee: Liberty Technologies, Inc., Conshohocken, Pa.

[ * ] Notice: The portion of the term of this patent subsequent to Aug. 18, 2009, has been disclaimed.

[21] Appl. No.: 931,092

[22] Filed: Aug. 17, 1992

Related U.S. Application Data

[63] Continuation of Ser. No. 800,333, Nov. 27, 1991, Pat. No. 5,140,263, which is a continuation-in-part of Ser. No. 511,657, Apr. 20, 1990, Pat. No. 5,086,273.

[51] Int. Cl.$^6$ .............................. G01B 7/14; F16K 37/00
[52] U.S. Cl. .................... 324/207.17; 116/277; 137/554; 324/226
[58] Field of Search ......................... 324/207.14–207.26, 324/234–236, 239–243, 226–228, 259–262; 137/554; 340/870.31, 870.32, 870.35; 116/277; 222/424.5

[56] References Cited

U.S. PATENT DOCUMENTS

| | | |
|---|---|---|
| 3,002,384 | 10/1961 | MacDonald et al. ............... 324/173 X |
| 3,017,621 | 1/1962 | Taborsky . |
| 3,602,254 | 8/1971 | Fawkes . |
| 3,859,619 | 1/1975 | Ishihara et al. ............. 324/207.14 UX |
| 3,914,994 | 10/1975 | Banner . |

(List continued on next page.)

FOREIGN PATENT DOCUMENTS

| | | |
|---|---|---|
| 0124377 | 1/1984 | Japan . |
| 0067677 | 10/1986 | Japan . |
| WO88/03241 | 5/1988 | WIPO .................................... 73/597 |

OTHER PUBLICATIONS

"Application Guidelines For Check Valves in Nuclear Power Plants", *Electric Power Research Institute Project 2233–20, Final Report*, Jan. 1988; cover & pp. 4–1 to 4–10 and 5–1 to 5–18.

"Significant Operating Experience Report", *Institute of Nuclear Power Operations*, Atlanta, Georgia, Oct. 1986 (13 pages).

"Performance Monitoring of Swing Check Valves Using Magnetic Flux Signature Analysis", *Information Package Containing Selected MFSA Test Results*, Haynes, H.D., Eissenberg, D. M., May, 1989 (10 pages).

J. A. Shercliff, The Theory of Electromagnetic Flow-Measurement, Cambridge University Press, (no month) 1962, pp. 86–107.

*Primary Examiner*—Sandra L. O'Shea
*Assistant Examiner*—Jay Patidar
*Attorney, Agent, or Firm*—Panitch, Schwarze, Jacobs & Nadel

[57] ABSTRACT

A system to determine the position of an electrically conductive element movably positioned in a housing, like a metal disc in a check valve, with greater accuracy and resolution than single magnet systems includes first and second A.C. electromagnets positioned in close proximity to the element on opposing sides of the housing. The magnets are excited with A.C. currents to generate magnetic fields which penetrate the housing and the element. The magnetic fields are sensed by a magnetic field sensor. A control portion of the system includes a microprocessor configured to allow an operator to adjustably select and set a common frequency, individual amplitudes and a phase difference between the two currents supplied to the two magnets so that the currents might be adjusted to cause the magnets to generate magnetic fields at least partially and preferably essentially cancelling one another at the sensor. The sensor senses essentially only a net perturbation in a magnetic field caused by movement of the electrically conductive member.

32 Claims, 6 Drawing Sheets

U.S. PATENT DOCUMENTS

| | | |
|---|---|---|
| 4,429,578 | 2/1984 | Darrel et al. . |
| 4,498,495 | 2/1985 | Worwood et al. . |
| 4,507,976 | 4/1985 | Banko . |
| 4,523,286 | 6/1985 | Koga et al. . |
| 4,535,629 | 8/1985 | Prine . |
| 4,573,114 | 2/1986 | Ferguson et al. . |
| 4,618,824 | 10/1986 | Magee et al. . |
| 4,636,780 | 1/1987 | Thomas et al. . |
| 4,711,266 | 12/1987 | Leiber . |
| 4,737,774 | 4/1988 | Chapman et al. . |
| 4,777,979 | 10/1988 | Twerdochlib . |
| 4,833,453 | 5/1989 | Twerdochlib . |
| 4,849,655 | 7/1989 | Bennett . |
| 4,914,388 | 4/1990 | Kalista et al. . |
| 4,968,934 | 11/1990 | Robinet et al. ................ 324/207.24 X |
| 4,977,778 | 12/1990 | Nafziger et al. . |
| 5,006,798 | 4/1991 | Matsuki et al. .................... 324/207.17 |
| 5,008,841 | 4/1991 | McElroy . |
| 5,086,273 | 2/1992 | Leon .................................. 324/207.17 |
| 5,140,263 | 8/1992 | Leon .................................. 324/207.17 |

METHOD FOR DETERMINING POSITION OF AN INTERNAL, MOVABLE CONDUCTIVE ELEMENT

RELATED APPLICATION

This is a continuation of U.S. patent application Ser. No. 07/800,333, filed Nov. 27, 1991, now U.S. Pat. No. 5,140,263, which is a continuation-in-part of U.S. patent application Ser. No. 07/511,657, filed Apr. 20, 1990 which is now U.S. Pat. No. 5,086,273.

BACKGROUND OF THE INVENTION

The present invention relates generally to the detection of the position of a metal part or other element of electrically conductive material movable in a device or apparatus and, more particularly, to a means for determining the position of the disc of a check valve while the valve is in operation.

Check valves are widely employed in nuclear power plants, refineries and other chemical processing plants, pipelines and elsewhere to control fluid flow. The purpose of a check valve is to allow fluid flow in one direction and prevent flow in the reverse direction. The force of the fluid passing through the valve pushes the disc open in the forward flow direction, but if the fluid starts to reverse its direction of flow, because an upstream pump has been shut off or for whatever reason, the disc closes to stop the reverse flow, usually assisted by gravity and sometimes by springs. When the disc closes, it moves down to seal against the valve seat which is located on the upstream side of the valve, thus shutting off the flow. When flow reestablishes in the forward direction, the disc swings up out of the way to allow the flow to take place unimpeded. A backstop usually exists in the valve to restrain the travel of the disc in the opening direction, thereby establishing the disc's full open position.

It is important to know the position of the disc within the valve to verify full closure or full opening or to assess the degree of partial opening or to see the existence and magnitude of a disc fluttering condition or a backstop tapping condition, the latter two being detrimental to the long term life of the valve, as they cause damage or wear to internal hinge pins, disc studs and other valve internal parts. Because it is not possible to see the disc, it is necessary to ascertain its position and behavior by alternative means from the outside of the valve. Though it is possible to attach linkages or even magnets to the valve internals and monitor their motion from the outside of the valve, such devices require special attachment means, and, in the case of linkages, special sealing means, and this makes their use somewhat undesirable.

The present invention addresses the problem of externally monitoring the operation of such a valve or other enclosed, movable, electrically conductive element, while avoiding the use of special internal attachments or sealing means or any disassembly of the valve or device enclosing such element.

SUMMARY OF THE INVENTION

In one aspect, the present invention is a system for detecting the position of an element movably enclosed in a housing. The system comprises first energy transmitting means positioned with respect to the housing and the element for transmitting energy to the element, the energy being perturbed by impingement upon the element, the perturbation of the energy varying with varying position of the element within the housing. The system further comprises detector means positioned for detecting energy transmitted by the first energy transmitting means after perturbation by the movable element, the detected energy having an unperturbed component and a superimposed, perturbed component. The system further comprises second energy transmitting means separated from the first energy transmitting means for transmitting energy also detected by the detector means, the detected energy having at least an unperturbed component. The system further comprises control means for adjusting the energy transmitted by at least one of the first and second energy transmitting means to at least partially cancel the unperturbed components of the first and second means energies detected by the detector means.

In another aspect, the invention is a system for detecting the position of an element movably enclosed in a housing which comprises first field generating means positioned for generating a first energy field within the housing perturbed by changes in position of the element within the housing. The system further comprises detector means positioned for detecting the first energy field after perturbation by the movable element, the detected first energy field having an unperturbed component and a superimposed, perturbed component. The system further comprises second energy field generating means positioned for generating a second energy field detected by the detector means, the detected second energy field having at least an unperturbed component. The system further comprises control means for adjusting the energy field generated by at least one of the first and second energy field generating means to at least partially cancel the unperturbed components of the first and second energy fields detected by the detector means.

BRIEF DESCRIPTION OF THE DRAWINGS

The foregoing summary, as well as the following detailed description of a preferred embodiment, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings.

DESCRIPTION OF PREFERRED EMBODIMENTS

Figure 1:
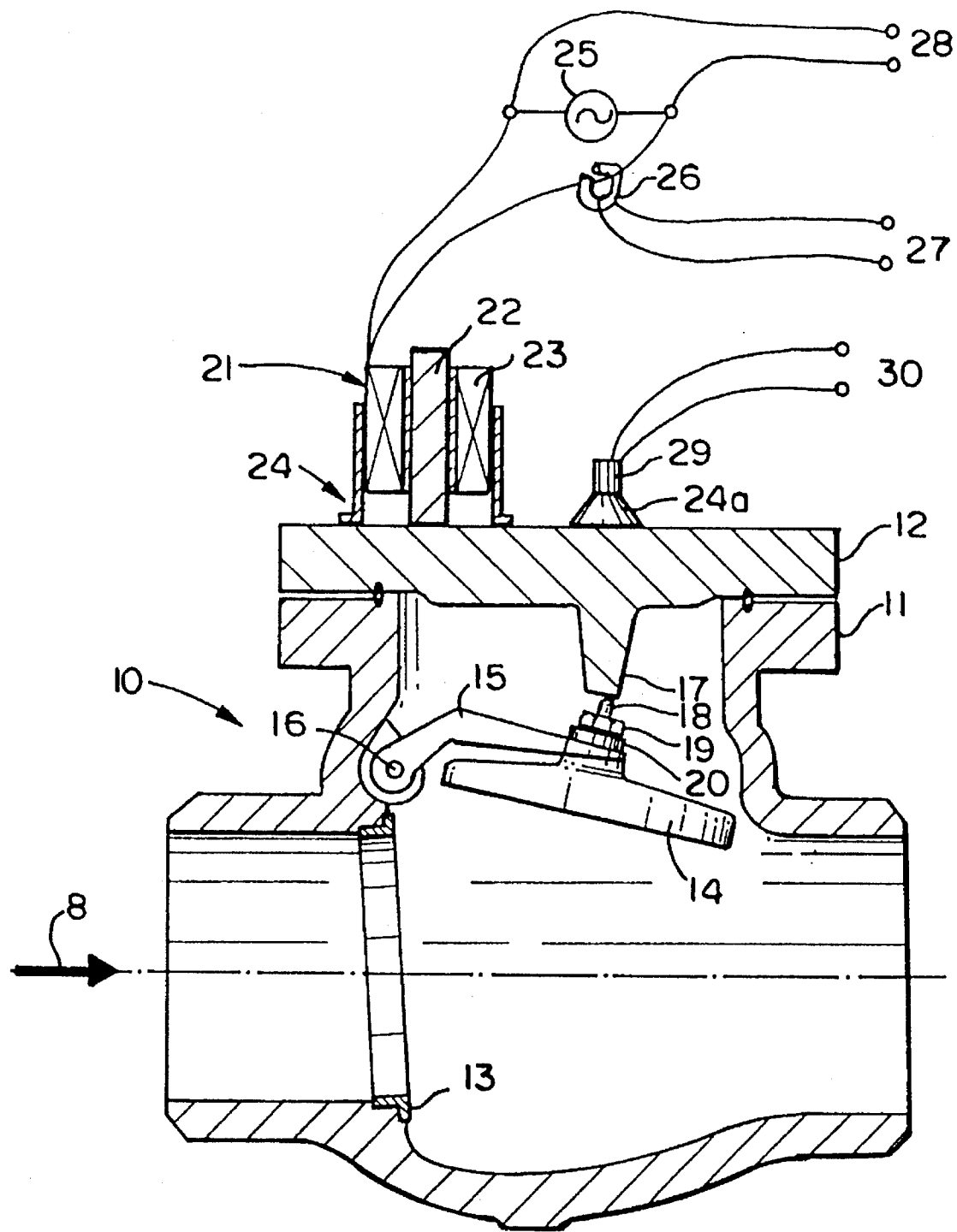
FIG. 1 is a diagrammatic, sectioned elevation view of a check valve with preferred components of a preferred system in accordance with the present invention.

Referring now in greater detail to the drawings, in which like numerals indicate like elements throughout, there is shown in FIG. 1, an elevation view of a swing-type check valve, indicated generally at 10 and shown in section. Forward fluid flow permitted by the valve 10 is indicated by arrow 8. This type of check valve is the most common type of check valve in use today in power plants, refineries and other large scale chemical processing plants, pipelines, etc. Such valves are commercially available from a variety of sources. The valve 10 includes a housing or casing in the form of a valve body 11, and a bonnet 12, typically removably coupled to the body 11 with bolts (not depicted). A seat 13 is provided to receive a disc 14 supported on an arm 15 pivotally coupled by a hinge pin 16 to the body 11 proximal the seat 13. A backstop 17, is formed by a central boss on the inner side of the bonnet 12. A stud 18 extends from the disc 14 through an end of an arm 15 remote from hinge pin 16. The disc 14 is secured to the arm 15 by a nut 19 and washer 20 received on the stud 18. At least one of the disc 14 and arm 15 must be made of an electrically conductive material in order for the system to work. Typically both are made of metal.

FIG. 1 further depicts diagrammatically some of the components of the system of the present invention which are generally associated with the valve 10. These include an A.C. electromagnet 21 having a core 22 and a surrounding coil 23. A temporary attachment means is indicated generally at 24 and is provided for positioning the electromagnet 21 proximal the casing 11 and the disc 14. Preferably, the attachment means 24 permits easy, repeated attachment of the electromagnet 21 to the valve 10 in the same location for taking measurements at different times. The core intensifies and focuses magnetic lines of force generated by the magnet 21 within the valve 10 particularly directly beneath the magnet in the vicinity of the seat, disc and arm 14–16. The coil 23 of A.C. electromagnet 21 is coupled with an A.C. voltage source indicated diagrammatically at 25. When the-coil 23 is excited by the A.C. source 25, the magnet 21 generates a magnetic field penetrating the housing formed by body 11 and bonnet 12, and the disc 14 and arm 15 within the housing. An instantaneous A.C. current flowing through the electromagnet 21, in particular, the coil 23, is preferably sensed by a first sensor means 26, such as a toroidal or clamp-on ammeter, the output of which is available for processing and/or recording at terminals 27. Second means are preferably provided for sensing instantaneous A.C. voltage across the electromagnet 21. Instantaneous A.C. voltage across the electromagnet 21 can be picked up directly from the A.C. source 25, as shown, and made available for recording at terminals 28. Alternatively, the voltage may be sensed indirectly by another sensor such as potential transformer (not depicted), the output of which can be made available at terminals 28. Preferably, a magnetic field sensor 29, such as Hall effect sensor, is provided, preferably mounted to the bonnet 12 through a high permeability focusing cone 29a to sense the instantaneous magnetic field generated by the electromagnet 21 which is oriented normal to the exterior surface of the valve body 11 and bonnet 12 at this or any other mounting location, as shown. Its output is made available for recording at terminals 30.

The A.C. current that flows in the coil 23 of electromagnet 21 creates an A.C. magnetic field that emanates from one end of the core 22 and returns through the other end. In between, many of the magnetic lines travel through the valve 10, its casing and its inner structure, including the hinge arm 15 and disc 14.

The use of an A.C. rather than a D.C. electromagnet provides more than just the addition of phase variation information subsequently discussed. It makes possible the use of the invention on valves, or other devices with movable conductive parts not made of ferromagnetic metal. The A.C. magnetic field will be affected by the position of the disc and/or the hinge arm just as long as one is or both are electrically conductive. The frequency of the A.C. current should be low, probably 60 Hz or less, so as to maximize the penetrating ability of the magnetic field.

As a result of the penetration of the magnetic field in the disc 14 and/or arm 15, the self-inductance L of the coil 23 varies slightly with the position of the electrically conductive one or both of the disc 14 and arm 15. This means that the amplitude and phase of the A.C. current flowing through the coil 23 also vary slightly with variation in the position of the hinge arm 15 and/or disc 14. Thus, detecting variations in the instantaneous amplitude or the instantaneous phase (with respect to the voltage) of the A.C. current through electromagnet 21 yields signals related to the instantaneous position of the arm 15 and/or disc 14 within the valve 10.

Since the position of the disc 14 and/or arm 15 affects the overall A.C. magnetic field, it also affects the A.C. magnetic field at the location of the magnetic sensor 29. Thus detecting variations of the instantaneous amplitude or the instantaneous phase (with respect to the voltage) of the output of the magnetic field sensor 29 also yields signals related to the instantaneous position of the disc 14 and/or arm 15 within the valve 10.

Figure 2:
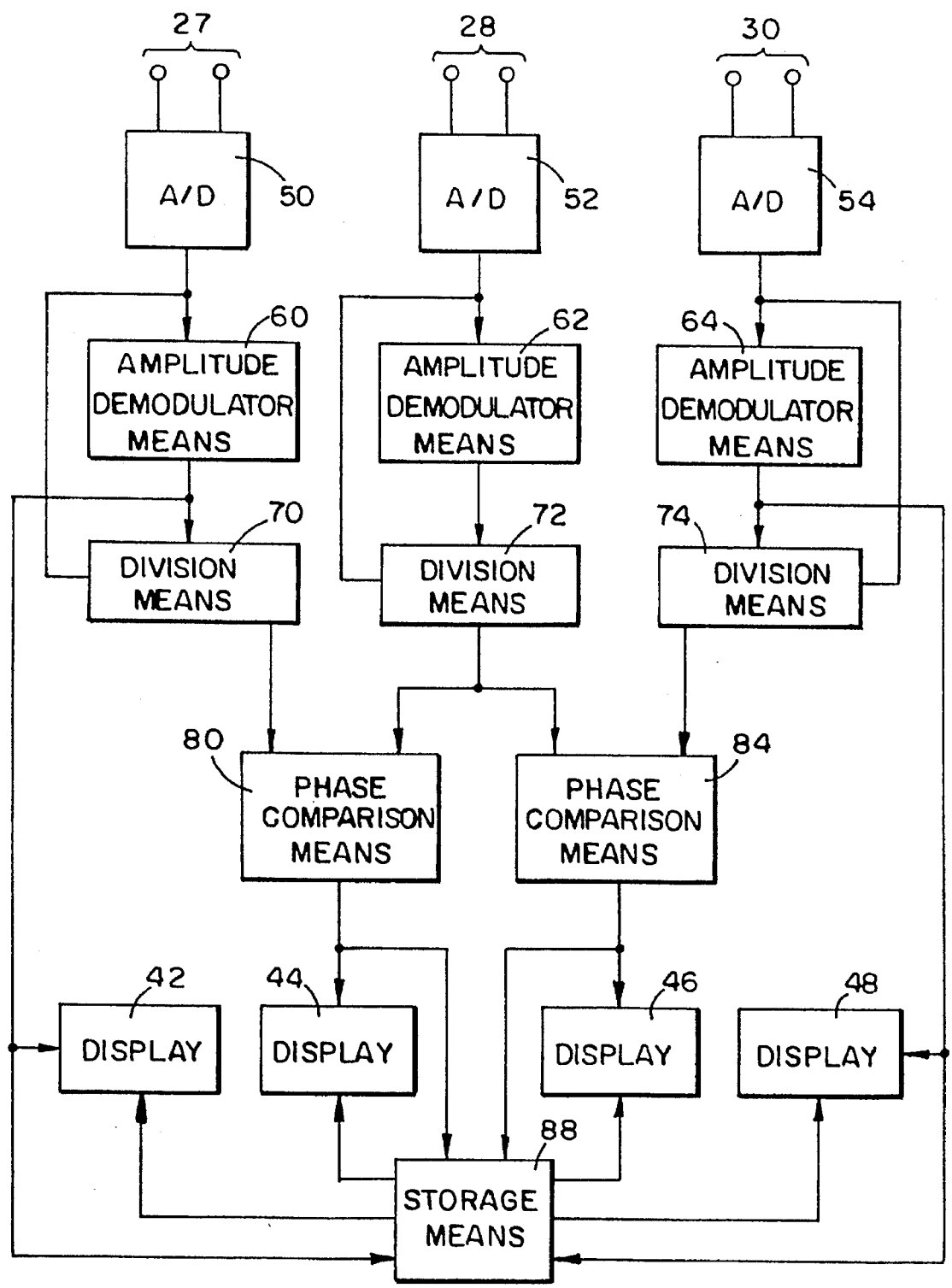
FIG. 2 is a functional block diagram showing the remaining components and operation of a preferred system.

FIG. 2 depicts, in block. diagram form, the remaining components of the preferred system of the present invention. The components will now be described in connection with a description of the use of the system to gather baseline data. The sensory components of the system are installed as indicated in FIG. 1 and the valve 10 operated, for example, by generating a fluid flow to move the disc 14 from a first position on the valve seat 13 where the valve 10 is closed to a second position with stud 18 contacting stop 17 on the bonnet where the valve is fully open. Any of a variety of conventional sensors can be used to determine and/or verify the fully opened and fully closed positions of the valve 10 and to note the occurrence of those conditions while the baseline data is being gathered. Three signals are presented to the components of the system in FIG. 2: the instantaneous A.C. current signal at terminals 27; the instantaneous A.C. voltage signal at terminals 28; and the instantaneous magnetic field signal at terminals 30. All, after any required analog conditioning such as amplification or filtering, are digitized by the system using separate, ordinary, commercially available, analog-to-digital converters 50, 52, 54, preferably simultaneously so that the gathered data can be phase correlated to one another and to the position of the disc/arm. Preferably, the digitized signals are then amplitude demodulated by amplitude demodulation means 60, 62, 64, respectively, for obtaining separate traces of sensed A.C. current, A.C. voltage, and magnetic field amplitude envelopes from each of the three original signals. This results directly in the generation of two of the four baseline traces: the A.C. current envelope (amplitude) trace and the magnetic field envelope (amplitude) trace. Alternatively, these traces could have been obtained by analog demodulation and filtering prior to-digitizing, but this typically limits the frequency response to one-half the A.C. frequency. In the preferred embodiment using digital demodulation, it is possible to retain frequencies beyond the A.C. frequency. As used herein, trace refers to any waveform or the data represented by such waveform.

In the next step, each data point of the digitized A.C. current amplitude trace from the amplitude demodulator means 60 is divided into the algebraic value of the corresponding digitized sample point from the A/D converter 50 by division means 70 to generate a trace of the digitized F.M. current waveform from the sensed instantaneous A.C. current signal. In like fashion, as is diagrammed in FIG. 2, a digitized instantaneous F.M. voltage waveform trace and a digitized instantaneous F.M. magnetic field waveform trace are also obtained through converters 52, 54, amplitude demodulator means 62, 64, and division means 72, 74, respectively, from the sensed A.C. voltage and magnetic field signals. These waveforms have the characteristic of having unity amplitude and only frequency or phase variations. Because of their unity amplitude characteristic, these waveforms can be compared on a point-by-point basis to determine their phase differences point by point. The digitized instantaneous F.M. current waveform from division means 70 is compared in this fashion with the digitized instantaneous F.M. voltage waveform from division means 72 in phase comparison means 80 for phase demodulating the sensed instantaneous A.C. current with respect to the sensed instantaneous A.C. voltage and for generating a digital trace of the sensed A.C. current phase waveform. In like fashion, the phase comparison means 84 phase demodulates the digitized, instantaneous F.M. magnetic field waveform from division means 74 with respect to the digitized instantaneous F.M. voltage waveform from division means 72 and generates a digitized trace of the magnetic field phase waveform. The phase waveform traces from phase comparison means 80 and 84 are the last two baseline traces. They show how the phasing of the A.C. current and A.C. magnetic field signals relates to disc/arm positioning. The previously obtained A.C. current and magnetic field amplitude traces show how the amplitude of the A.C. current and magnetic field signals, respectively, relate to disc/arm positioning.

At the very least, the A.C. current amplitude and the magnetic field amplitude traces from amplitude demodulation means 60 and 64 and the phase traces from phase comparison means 80 and 84 are stored in storage means 88 for future determination of the position of the disc/arm combination. If desired, the analog signals at 27, 28 and 30 and/or the digital signals from A/D converters 50, 52 and 54 can be recorded for delayed processing.

Each of the four traces from components 60, 64, 80 and 84 (and any of the other signals being gathered) can be displayed. Four trace displays 42, 44, 46 and 48 are indicated to show that any and all of the four preferred traces can be displayed at one time. Preferably, each of the baseline traces is displayed shortly after generation so that proper gathering of a usable trace is verified.

Preferably, amplitude demodulation means 60, 62, 64, division means 70, 72 and 74 and phase comparison means 80 and 84 are all provided by a suitably programmed personal computer (not depicted). Alternatively, dedicated circuits and/or processors could be used. Storage means 88 may be any conventional digital data storage means which is capable of capturing and retaining at least the digitized data outputted from means 60, 64, 80 and 84. Preferably, storage means 88 is a single device associated with the personal computer. However, storage means 88 can be provided by one or more dedicated storage devices.

FIG. 2 also conceptually shows how the three signals made available at terminals 27, 28 and 30 preferably are manipulated in various combinations to subsequently extract information about the instantaneous position of the disc 14. After repositioning the cone 29a, magnet 21 and sensor 29 in their original positions with respect to the valve 10, the magnet 21 is excited with the A.C. source 25 and signals presented at contacts 27, 28 and 30. Traces are again generated from the signals presented at contacts 27, 28 and 30 using the various means 50, 52, 54, 60, 62, 64, 70, 72, 74, 80 and 84 in exactly the same manner that the baseline traces were generated. Preferably, the four preferred traces are again recorded in the storage means 88 for display and analysis. Up to four separate displays may be presented: 42, 44, 46, and 48. Each display 42, 44, 46, and 48 preferably presents a separate trace representing, in different fashion, the instantaneous position of the disc (or arm or arm/disc combination). Any one of the displays 42, 44, 46, and 48 can be used to indicate instantaneous position, but one type of display may be clearer for one valve or one portion of disc/arm travel, while a different trace might be clearer for another. Thus, there is an advantage to more than one display. The present invention covers all possible combinations of the one to four displays 42, 44, 46, and 48. Of course, while four separate and simultaneous displays 42, 44, 46, and 48 are indicated, one of ordinary skill will appreciate that the displays 42, 44, 46 and 48 can be depicted simultaneously on separate display devices, simultaneously in different regions of a single display device or sequentially on a single display device.

Baseline traces in storage means 88 are retrievable and can be displayed with the more recently obtained traces. Baseline traces at the very least provide values corresponding to the disc at the fully closed and fully open positions. These values can be compared to the instantaneous values of the more recently obtained traces to determine the position(s) of the disc when the more recently obtained instantaneous values were obtained. This can be done in a variety of ways including simultaneous or sequential displays of baseline traces and more recently gathered instantaneous traces. Moreover, the baseline trace(s) can be reduced to a table or scale on the display, even one having only maximum and minimum values. Undoubtedly, more complicated displays can be created including, for example, a moving CAD/CAM representation of the valve.

While the functional block diagram of the basic circuitry of the presently preferred embodiment of the invention is illustrated in FIGS. 1 and 2 and described above, it will be appreciated that the invention may be implemented utilizing different circuitry. It will also be appreciated that the particular manner in which the block diagram of FIG. 2 is specifically implemented is well within the skill of an ordinary designer and that particular circuits, components, etc., will vary, depending upon the specific design approach employed. In particular, the processing circuitry including elements 50, 52, 54, 60, 62, 64, 70, 72, 74, 80, and 84 can be provided by hardware, firmware, software, and combinations of the above.

In the first embodiment system depicted in FIGS. 1 and 2, most of the magnetic flux seen by the magnetic field sensor 29 travels through the bonnet 12 and body forming the housing of the valve 10 and not through the valve disk 14 or arm 15. The full travel of the disk 14 and arm 15 might result in only a small perturbation in the output of the sensor 29. This perturbation may be as small as one part in one thousand, for example, one millivolt changing to 0.999 millivolts. For the typical ten volt maximum amplified output provided to such sensors, the A.C. gain would be limited to about 10,000. More importantly, for the typical digital resolution of approximately one part in 4,000 typically provided by A/D converters, the total disk travel would be resolvable into only four parts. This is the change of one part in 1,000, resolved into one part in 4,000.

To improve resolution of the sensor signal perturbation and thereby improve resolution of the disk/arm position, a second preferred embodiment system is depicted in FIGS.

3–6 also installed on an identical valve 10. The second preferred embodiment system provides two magnetic field generators in the form of two, preferably substantially identical A.C. electromagnets 21 and 21a. Each magnet might include a coil 23/23a of about 900 turns of 18 gauge copper wire, approximately four inches long by 2.5 inches in diameter, around a laminated silicon steel core 22/22a about six inches long and about 0.5 by 0.5 inches in cross section. A magnetic field sensor 29, preferably again a Hall effect sensor such as an F. W. Bell Model BH704, and a high magnetic permeability focusing cone 29a are again provided. Preferably electromagnet 21 is placed on the bonnet 12, in the position formerly occupied by the magnetic field sensor 29 in the first embodiment, so as to be more closely positioned to the electrically conductive disk 14 at the upper end of its travel. Preferably, the second electromagnet 21a is located on the lower side of the casing body 11 proximal the seat 13, which represents the other extreme end of the travel path of the disk and arm. The sensor 29 is preferably moved to a position between the two electromagnets 21 and 21a and located where it is best able to sense changes in the magnetic fields generated by both electromagnets 21 and 21a throughout the travel path of the disk/arm. Preferably, the focusing cone 29a is placed against the body 11 of the valve casing proximal the hinge pin 16. Again, each magnet 21, 21a and sensor 29 is located by temporary attachment means 24, 24a and cone 29a in a manner such that the electromagnets 21 and 21a and sensor 29 may be removed and then substantially identically repositioned on the valve 10 at a later time for subsequently remonitoring the valve. Using appropriate controls, which will be subsequently described with respect to FIGS. 4–5, the amplitude and phase of the alternating current in each coil 23, 23a is adjusted so that the A.C. magnetic field generated by both electromagnets 21 and 21a essentially cancel one another at the magnetic sensor 29, yielding a zero or near zero output of the sensor 29 while the arm/disk combination is in the fully opened. positioned shown in FIG. 3 or, alternatively, in the fully closed position against seat 13. The control portion of the system then precisely maintains this initially adjusted amplitude, frequency and phase relationship between the two currents of electromagnets 21, 21a, regardless of how the arm/disk combination is moved from the initial set-up position.

Figure 3:
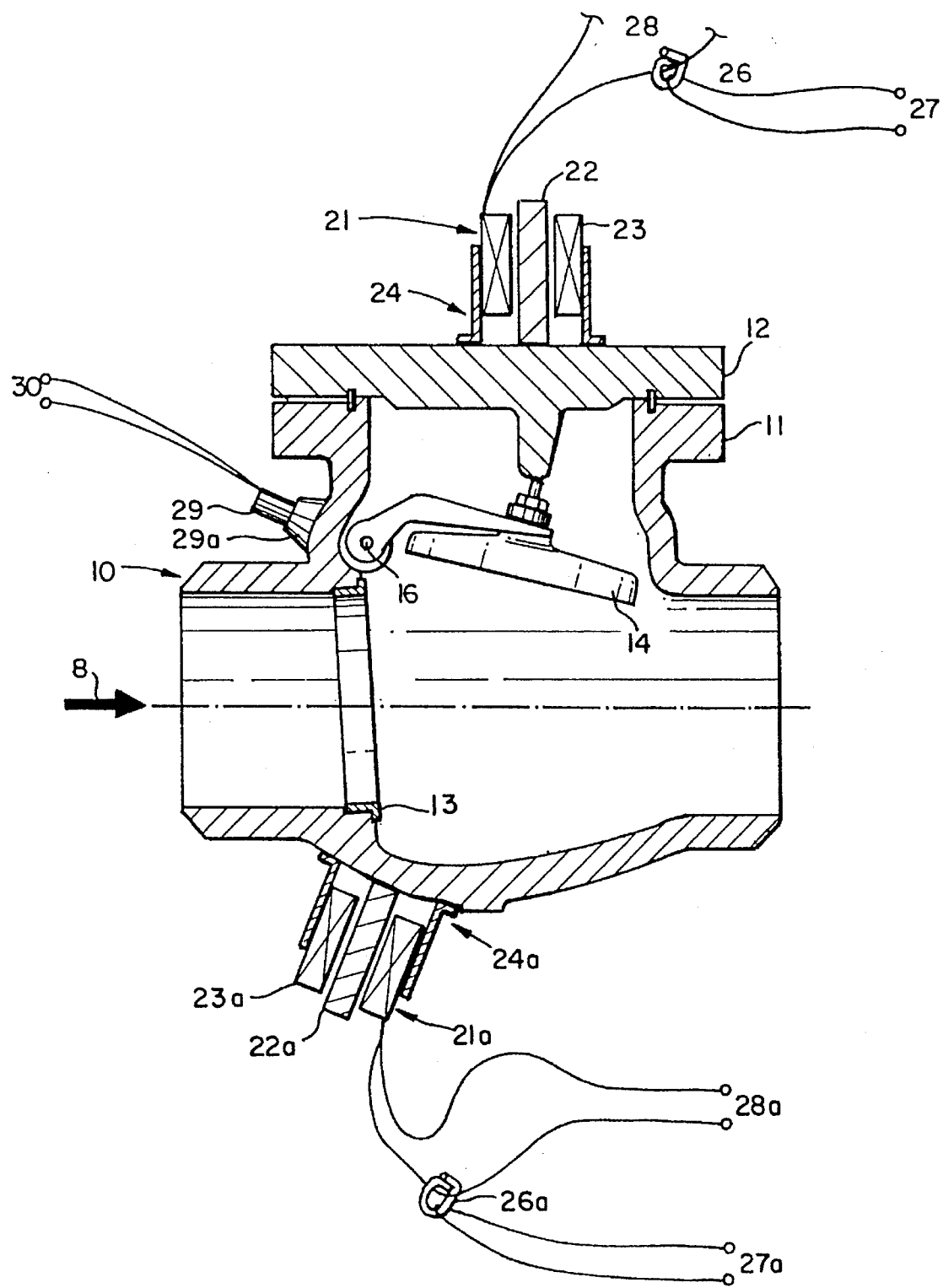
FIG. 3 is a diagrammatic, sectioned elevation view of a check valve with the preferred components of a second preferred system in accordance with the present invention.

For example, at the set-up position shown in FIG. 3, the magnetic flux at the sensor 29 from the coil 23 of the upper electromagnet 21 on the bonnet 15 might be detected and give rise to a 1,000 millivolt A.C. signal from the sensor 29. At the same time, the flux at the sensor 29 from the coil 23a of the second electromagnet 21a, at the bottom of the valve casing body 11 might be detected and give rise to a 1.000 millivolt A.C. signal of the opposite phase from the sensor 29. Hence, the net field detected by the sensor and the output of the sensor 29 would be essentially zero.

When the disk/arm combination 14/15 pivots from the fully open to the fully closed positions, the flux at sensor 29 from the top mounted coil 23 will be reduced while the flux at the sensor 29 from the coil 23a at the bottom of the valve casing body 11 will be increased. Using the same numerical change indicated with respect to the first embodiment system, the sensor 29 might generate a 0.999 millivolt output signal from the combined unperturbed and perturbed field components it senses being generated by the top mounted coil 23 while it might generate a 1.001 millivolt output signal of the opposite phase for the combined unperturbed and perturbed field components it senses being generated by the bottom coil 23a for a net or resultant output signal of 0.002millivolt from the sensor 29. The 0.002 millivolt output would be essentially the combined perturbed components of the two magnetic fields being generated by magnets 21, 21a, the unperturbed components essentially cancelling one another. Thus, with the full motion of the disk/arm, the output of sensor 29 would go from 0.000 to 0.002 millivolts. For a typical ten-volt maximum amplified output permitted with such detectors, the A.C. gain would be allowed to go to five million, or five hundred times the previous value allowed by the first embodiment system. Furthermore, for the typical digital resolution of approximately one part in four thousand provided by A/D converter 54, the total disk travel could be resolved into all four thousand parts or one thousand times the resolution permitted by the first embodiment system.

Figure 4:
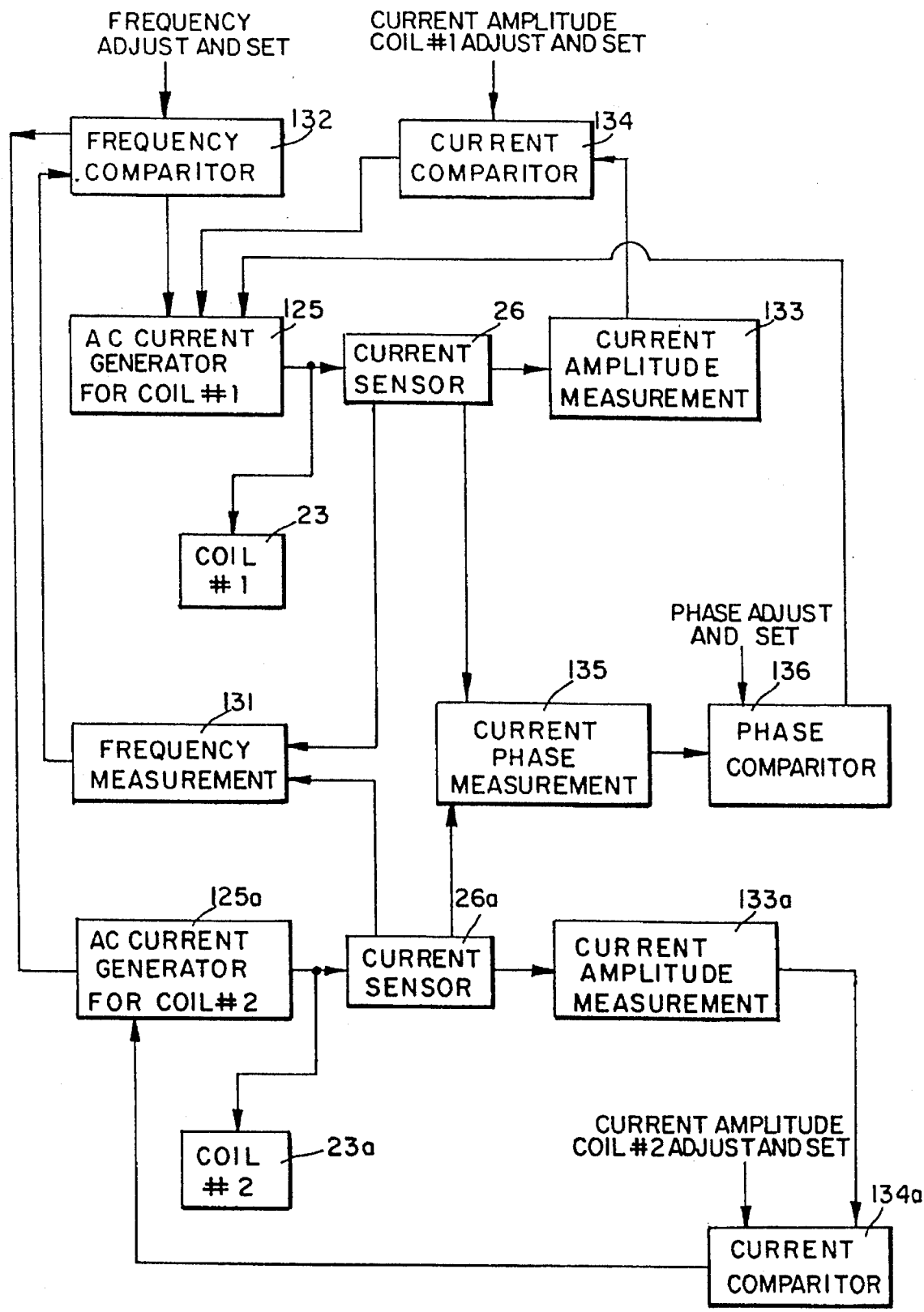
FIG. 4 is a functional block diagram showing the components of a control portion of the second preferred system.

FIG. 4 depicts a preferred control portion of the second preferred embodiment system in functional block diagram form. Individually controlled A.C. current generator means 125 and 125a are provided for generating separate alternating currents for the coils 23 and 23a of the first and second electromagnets 21 and 21a. Preferably, each of the A.C. current generator means can be fully adjusted in amplitude, phase and frequency. The alternating currents provided by the generator means 125, 125a to each coil 23, 23a are sensed by current sensors 26, 26a (see also FIG. 3). Preferably, means 131 are provided for measuring the frequencies of the current generated by the first generator means 125 and the current generated by the second generator means 125a. Means 132 are preferably provided for receiving the frequency measurements from means 131 and for comparing the sensed frequencies with a preselected desired frequency. Preferably, the frequency comparator means 132 are selectively adjustable and settable so that the user of the system may select a desired, nominal A.C. frequency for the alternating currents, preferably over a range from below 60 Hz to above 2,000 Hz. Preferably, the frequency comparator means 132 are used to control the A.C. generator means 125 and 125a so as to adjust the frequencies of the A.C. currents generated by each means 125, 125a to the desired, preselected nominal frequency.

The control portion of the system further preferably includes means 35 for current phase measurement. Means 135 receives outputs from the two current sensors 26, 26a and measures the phase of each alternate current being generated. The current phase measurements are preferably passed to a selectively adjustable and settable phase comparator means 136. Means 136 preferably can be adjusted to select any desired phase difference between the two currents being generated and to maintain that phase difference by feedback control through either of the A.C. generator means 125, 125a. While A.C. current generator means 125 is depicted in FIG. 4 as being controlled, A.C. current generator means 125a could have been controlled instead.

Preferably, current amplitude measurement means 133 and 133a are provided to receive outputs from each of the current sensors 26 and 26a, respectively, and to determine the amplitudes of the alternate currents being passed to the coils 23, 23a. Further preferably provided are current comparator means 134 and 134a, each of which is coupled to its respective A.C. current generator means 125 and 125a. Each of the current comparator means is preferably selectively adjustable and settable so that the operator may initially adjust each comparator means 134, 134a to a desired current amplitude. Each comparator means 134, 134a thereafter responds to the sensed current amplitudes to control each generator 125, 125a to output an alternating current of desired amplitude and phase. Once the nominal frequency, current amplitudes and phase difference are selected and set, the frequency comparator means 132, phase comparator means 136, and current comparator means 134, 134a maintain the set levels by feedback to the generator means 125, 125a.

Figure 5:
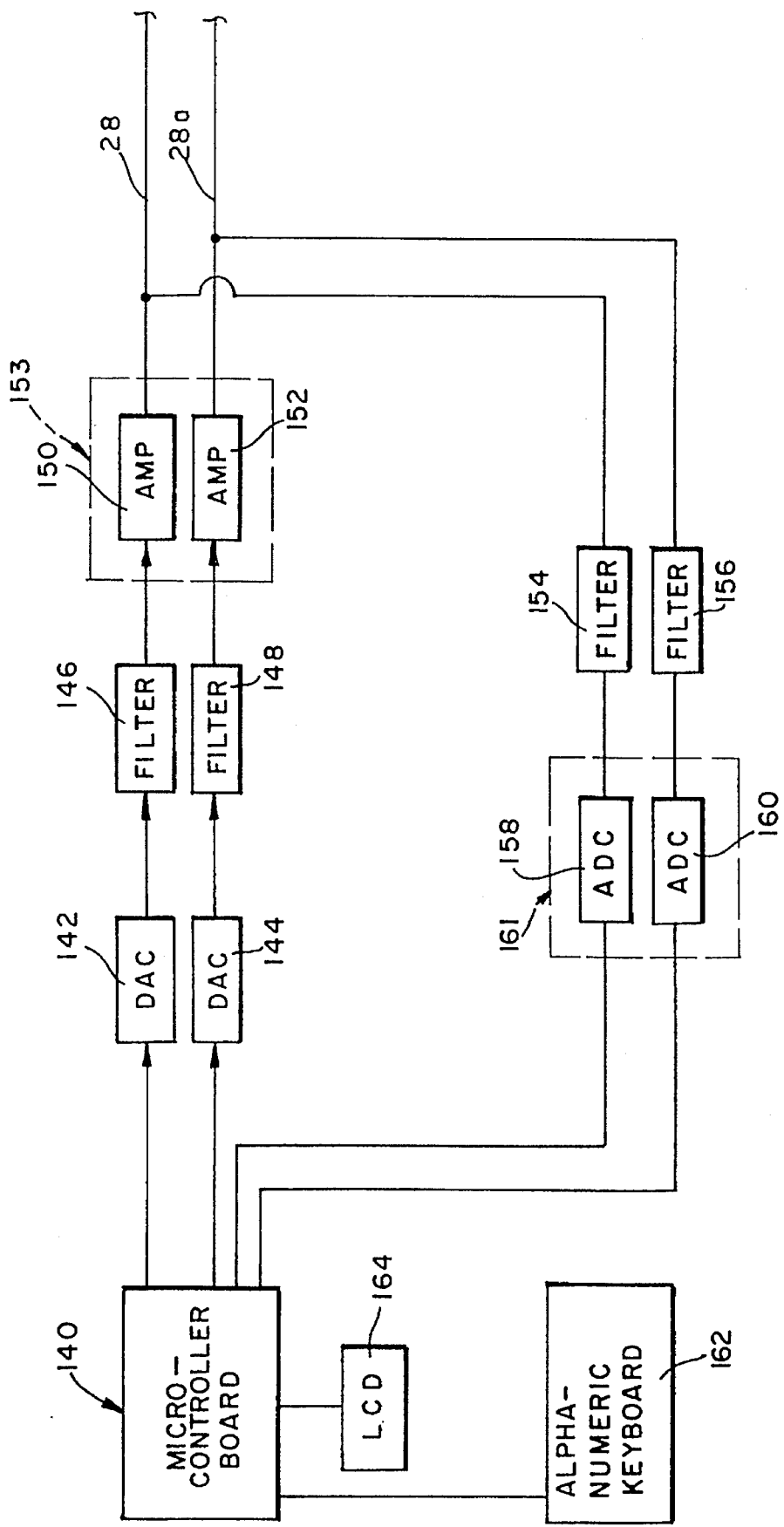
FIG. 5 is a functional block diagram of the electrical components constituting the control portion of the second preferred system.

FIG. 5 depicts in block diagram form some of the physical components of the control portion of the second preferred embodiment. Preferably, the control portion includes a microcontroller board 140 such as a Siemens 80535, which comprises an eight bit microprocessor, an associated memory, input ports and output ports. Two of the output ports of the board 140 are coupled to the inputs of separate digital to analog converters 142 and 144, which might be, for example, AD7837 type converters. Outputs of each digital to analog converter 142 and 144 are coupled to filters 146 and 148, respectively, for smoothing. Filters 146 and 148 are preferably low pass and preferably roll-off at a rate of 24 db/octave above the set frequency. Outputs from the filters 146 and 148 are connected to power amplifiers 150 and 152, respectively, which may be the channels of a single dual channel power amplifier 153. The power amplifier 153 is preferably a Hafler amplifier type SE-240 having at least a pair of input channels and a pair of output channels. Outputs from the amplifiers 150, 152 are passed to magnet coils 23 and 239a, respectively.

All current sensing is preferably accomplished through the current sensors 26 and 26a, which are preferably F. W. Bell IHA-25 Hall effect type non-contact current sensors. Electrical signals generated by these current sensors 26 and 26a are passed through filters 152 and 154, respectively, to analog to digital converters 158 and 160, respectively, which may be AD1674 converters provided on a single chip 161. Each of the filtered, digitized current sensor signals are thereafter passed from the analog to digital converters 158 and 160 to input ports of the microcontroller board 140. Preferably, an alphanumeric keyboard 162 and a visual display device, such as a 4×16 alphanumeric LCD 164 are coupled with the microprocessor board 140 to permit operator control of the control portion of the system and, more specifically, for selectably setting and adjusting the frequency, amplitudes and phase difference of the alternating currents.

The microprocessor of the microcontroller board 140 generates digital values for two sine waves which are converted by the digital to analog converters 142 and 144 into reconstructed analog sine waves. The reconstructed sine waves are passed to the Hafler amplifier 153 which generates a pair of alternating currents driving the excitation coils 23 and 23a, respectively, of the two electromagnets 21 and 21a. Current sensors 26 and 26a sense the currents being provided to each coil 23, 23a by the amplifier 153 and provide feedback analog signals for current control. Filters 154 and 156 remove any DC and high frequency A.C. components from the analog signals prior to the digitization of those signals by the analog to digital converters 158 and 160. The filtered, digitized sensor signals are returned to the microcontroller board 140 and analyzed by the operating program of the microprocessor. The microprocessor of the microcontroller board 140 performs the function of the frequency measurement means 131, frequency comparator means 132, current amplitude measurement means 133, 133a, current comparator means 134, 134a, current phase measurement means 135 and phase comparator means 136, all through software. In one version of the preferred embodiment, the frequency and the phasing of the two currents, once set, are stable enough not to require further frequency and phase comparisons. In this case, prior to A/D conversion, the signals coming out of filters 154 and 156 are rectified and further filtered (neither shown), to provide signals indicative of the two current amplitudes only. The microcontroller software is designed to functionally operate in the manner described with respect to FIG. 4. Current frequency, amplitude and phase difference adjustment and setting are accomplished by operator commands through the keyboard 160 and adjustment of the sine wave values generated by the microprocessor. Preferably, the microprocessor can write the digital sine wave data to the digital to analog converters 142, 144 at minimum rates of at least ten times the frequencies of the sine waves being reconstructed. Phase resolution can be much better than the apparent thirty-six degrees from the ten values. One degree resolution is achieved by reading the ten amplitude values to be used from a three-hundred-sixty point lookup table.

Figure 6:
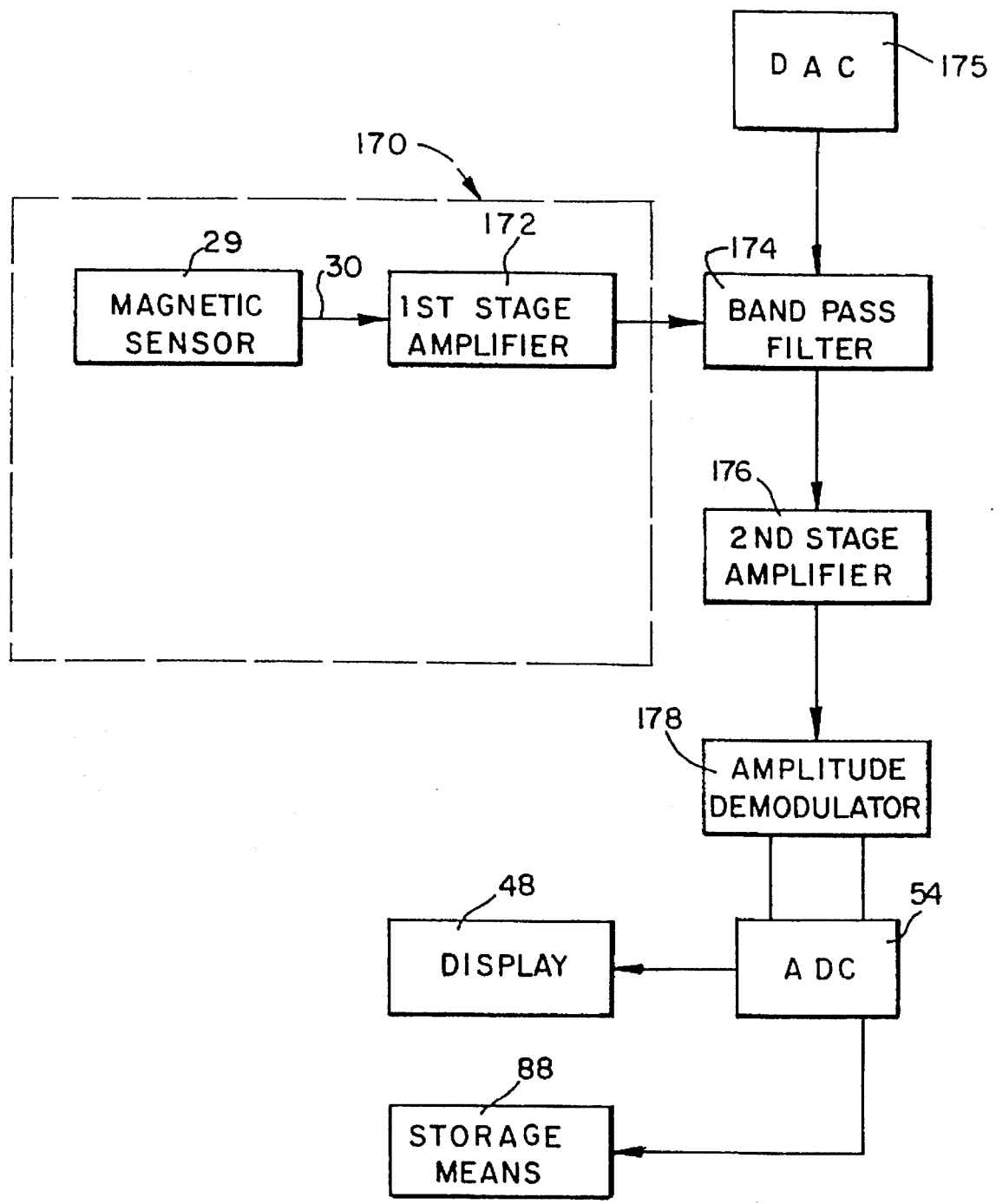
FIG. 6 is a functional block diagram of the magnetic field detector and remaining components of the most basic configuration of the second preferred system.

FIG. 6 depicts in block diagram form the remaining physical components of the second preferred embodiment system which gather magnetic field data for determining the location of the conductive member(s) 14, 15 within the valve 10. The magnetic sensor 29 forms part of an overall magnetic field detector 170 which preferably includes, in addition to the magnetic sensor 29, a first stage amplifier 172. The detector signal goes to a band pass filter 174 preferably having a selectively adjustable center frequency set by the microcontroller through a DAC/75, and a second stage amplifier 176 receiving the band pass filtered output from filter 174. The output of amplifier 176 then goes to an amplitude demodulator 178, which provides a D.C. signal indicative of the magnetic field strength at the sensor 29. The D.C. signal then goes to an analog to digital converter 54 which generates a digital trace signal representing the magnitude of the net magnetic field sensed by sensor 29 of detector 170 over time. The generated trace may be displayed on display means 48, stored in the storage means 88 for later comparison or other use, or both. Preferably, amplifiers 172 and 176 each provide a gain of about one thousand for a total gain of about one million. Band pass filter 174 preferably has a pass band width of between about ±10 and ±15 Hz about a selected center frequency corresponding to the nominal frequency of the magnet coil currents. Preferably, amplifier 176 and band pass filter 174 are integrated circuit elements located on a single board together with the digital to analog converter 175 that is coupled to one of the output ports on the microcontroller board 140 so that the set coil current frequency is the same frequency used to set the center frequency of the filter 174. The display means 48 and storage means 88 may be part of a P.C. type computer separate from the controller microcomputer board 140. For example, display means 48 may be a CRT associated with the computer while the storage means 88 might be a hard or floppy disk of the computer. The computer can be used to store, process and analyze the recovered trace and to indicate in real time or near real time the determined position of the conductive element(s) 14/15. Alternatively or in addition, the demodulated signal from demodulator 178 and ADC 54 might be recorded on another storage means such as, for example, a Digital Audio Tape (DAT) recorder for permanent storage or processing by a remotely located processor or both.

Operation of the second preferred embodiment system shown in FIGS. 3 through 6 is as follows after installation of the magnets 21, 21a and sensor 29. Preferably, a nominal A.C. operating frequency is selected and entered through keyboard 162. Adjustments to the frequency of the currents generated by generators 125 and 125a can also be entered at any time through keyboard 162. For ferromagnetic materials such as carbon steels and for highly conductive materials such as brass, the operating frequency is preferably set reasonably low, usually 200 Hz or less. This is to minimize any current losses in the cores 22, 22a and in the body 11 and bonnet 12 of the valve housing or casing. For less conductive materials such as nonmagnetic stainless steels, a higher frequency is selected, for example preferably about 2,000 Hz or more. This is to maximize eddy currents in the arm/disk or other moving electrically conductive element(s). The frequency comparator means 32 is effectively adjusted by operator entry of a selected frequency through the keyboard 160. This "locks" the microcontroller 140 into that frequency. The current generators 125 and 125a are maintained at those nominal frequencies through feedback control by frequency comparator means 132, which function is provided by microcontroller 140. Once the initial frequency is set, the valve disk 15 is placed either in the full open position shown in FIG. 3 or the full closed position (not depicted) against the valve seat 13, whichever is most convenient at the time. The current to a No. 1 or first coil is increased to about half of its amplitude range and temporarily fixed through keyboard data entries. A maximum magnet current amplitude of about one amp has proven sufficient with this system but the system is capable of generating alternating currents with magnitudes of up to five amps. The No. 1 coil may be either coil 23 or 23a but is preferably the coil of the magnet closest to the disk 15 in the selected set-up position. The current in the second or remaining coil No. 2 is then preferably increased and its phase adjusted, again through keyboard data entries, until a zero or near-zero A.C. output is obtained from the magnetic sensor 29 and detector 170. Each current level may be increased still further and the phase difference adjusted, if necessary, to maintain a zero or near-zero A.C. output from the magnetic sensor 29. It is important that the current levels not be raised so high as to cause distortion. Next, the current in the coil least coupled to the sensor 29 in the set-up position (fully opened or fully closed) is slightly increased. For example, in the fully opened, set-up condition depicted in FIG. 3, the lower coil 23a, being farthest from the disk 14, would be the coil least coupled to the sensor 29 and would have its current amplitude slightly increased. This step insures that the output signal from sensor 29 will increase continuously without going through a null point, as the disk/arm 14/15 moves away from the set-up position. Were the output signal of the sensor 29 to null, for example slightly decrease then increase, an ambiguity would arise between the amplitude of the output of sensor 29 or detector 170 and the position of the disk/arm 14/15. The phase of one of the two coil currents, the current of coil 239a for example, is adjusted, if necessary, through the phase comparator means 136 function of the microcontroller 140 such that the magnetic fields generated by each coil 25, 25a and detected by detector means 170 are exactly out of phase at the set-up position. Lastly, the center frequency of the band pass filter 176 is adjusted, again by keyboard data entry, to the selected nominal frequency of the alternating currents being generated. Once the frequency, amplitudes and phase difference are set by keyboard commands, the microcontroller 140 maintains the currents at their selected values by monitoring feedback signals from sensors 26/26a through filters 154/ 156 and A to D converters 158, 160.

Preferably, the operating program of the microcontroller 140 is configured to permit adjustment of the generated alternating currents to within about one degree of phase, one hertz of frequency and at least about 0.1% of maximum amplitude. All adjustments are accomplished through the digital trigonometric values generated and outputted by the microcontroller 40 through the DAC's 142, 144, filters 146, 148 and power amplifiers 150, 152. The band pass filter 176 might typically be set at about ±10 to ±15 Hz about the center frequency in order to accommodate flutter motions of the disk 14, which are typically less than 15 Hz. The width of the band pass filter might be adjusted to other appropriate ranges for use of the system in sensing other types of conductive element motions.

FIGS. 3 through 6 depict the components of a basic preferred system. If desired, the basic system can be supplemented to generate current amplitude and/or voltage amplitude traces for one or both of the electromagnets, in the manner of the first embodiment system.

One skilled in the art will appreciate that the inventive aspects of the second preferred embodiment system are not limited to use with field generator devices such as the disclosed A.C. electromagnets 21, 21a, but could also be applied to positioning systems employing other types of energy transmitting means, for example, an acoustic energy transmission system in which a pair of acoustic energy transmitters would be positioned and operated to effectively cancel the unperturbed component of their combined acoustic energies detected after impingement upon and reflection from a moving element so as to leave the superimposed, perturbed component of the reflected energies unaffected for detection.

While digital current generation and control are preferred, one of ordinary skill would appreciate that the entire control portion of the present application, or virtually any part of it, could be provided by equivalent standard analog control elements and subcircuits. Digital control is preferred as being superior overall in that it permits the operator to know exactly what adjustments are being made from what values are being selected and precisely what the response of the system is to each.

While Hall effect type non-contact current sensors (inductive current transformers) are preferred for the current sensors 26, 26a, one of ordinary skill in the art will appreciate that various methods of current detection including other types of clamp-on transformer coils and shunt resistor circuits could be employed to generate a detector signal indicating the control characteristics (frequency, amplitude and phase) of each of the electromagnet currents.

One of ordinary skill in the art will appreciate that resolution of the magnetic field perturbation in the first preferred system of FIGS. 1 and 2 could have been increased using a single electromagnet by simultaneously applying a bucking A.C. signal against the sensor output at the set-up point. However, a one percent change in sensor sensitivity, which would yield a corresponding one percent error in disk position in the second preferred embodiment system, could yield a one thousand percent positioning error utilizing a bucking voltage, if the full scale change in flux at the sensor were only one part in one thousand, as previously indicated.

From the foregoing description, it can be seen that the present invention comprises a system for externally determining the position of the disc in a check valve or other electrically conductive element movably enclosed in a housing. The system is adaptable not only to swing-type check valves as described herein, but also to other types of check valves having a position-changeable metal disc, and generally to other housing or casing enclosed devices where the overall position of some large electrically conductive internal part needs to be known.

It will be appreciated by those skilled in the art that the applications and changes of the type discussed above, as well as other applications and changes, could be made to the described embodiment without departing from the broad inventive concepts thereof. For example, the present system improves signal to noise ratio of the perturbed magnetic energy field by generating two additive perturbed components while simultaneously generating two cancelling unperturbed components. Simply increasing the perturbed component or at least partially cancelling or reducing the unperturbed component of the first single A.C. magnet embodiment of the invention would constitute an improvement over that embodiment and the present invention is intended to encompass those modifications as well. It is understood, therefore, that this invention is not limited to the particular embodiment discussed, but it is intended to cover all modifications which are within the scope and spirit of the invention as defined by the appended claims.

I claim:

1. A method for detecting the position of an element movably enclosed in a housing, comprising the steps of:

transmitting energy from a first transmitter located outside the housing through the housing to the element within the housing such that the transmitted energy is perturbed by impingement upon the element, the perturbation of the energy varying with varying position of the element within the housing;

detecting energy transmitted by the first energy transmitter with a detector, the first transmitter energy detected by the detector including an unperturbed component and a superimposed, perturbed component from the element;

transmitting energy detectable by the detector from a second transmitter separate from the first transmitter; and adjusting the energy being transmitted by at least one of the first and second transmitters to at least partially cancel the unperturbed component of the first transmitter energy being detected by the detector with the second transmitter energy being detected by the detector.

2. The method according to claim 1 wherein the energy adjusting step further comprises the step of varying an amplitude of the energy transmitted from the one transmitter.

3. A method according to claim 1 wherein the energy adjusting step comprises the step of varying a phase of the energy transmitted from the one transmitter.

4. A method according to claim 1 wherein the energy adjusting step comprises the step of varying an amplitude of an alternating current supplied to the one transmitter.

5. A method according to claim 1 wherein the energy adjusting step further comprises the step of varying a phase of an alternating current supplied to the one transmitter.

6. A method according to claim 1 further comprising the step of maintaining uniformity of the energy being transmitted by at least a remaining one of the first and second energy transmitters.

7. A method according to claim 1 further comprising the initial step of locating each of the second energy transmitters and the detector outside the housing.

8. A method according to claim 1, wherein each of the first and second energy transmitters transmits magnetic energy during the energy transmitting step.

9. A method according to claim 8 wherein the movable element is electrically conductive and wherein the energy transmitting step comprises generating an alternating electromagnetic field with each of the first and second transmitters outside the housing, each field being of sufficient strength to penetrate the housing and to be detectably perturbed by the movable element.

10. A method according to claim 9 wherein the energy adjusting step further comprises the step of selectively adjusting a frequency of an alternating current supplied to at least one of the first and second transmitters.

11. A method according to claim 1 wherein the energy adjusting step further comprises the step of independently adjusting the energy being transmitted by each of the first and second transmitters.

12. A method according to claim 1 wherein the energy adjusting step further comprises the step of adjusting at least one of the first and second transmitters to at least essentially cancel the unperturbed components of the detected first and second transmitter energies.

13. A method according to claim 12 wherein the energy adjusting step further comprises the step of adjusting at least the one energy transmitter such that the combined perturbed components of the energies detected by the detector exceed either of the detected individual perturbed energy components in magnitude.

14. A method according to claim 1 wherein the energy adjusting step further comprises the step of adjusting at least one energy transmitter such that the combined perturbed components of the energies detected by the detector exceed either of the two perturbed components in magnitude.

15. A method for detecting the position of an element movably enclosed in a housing comprising the steps of:

transmitting energy from a first location outside the housing through the housing to the element within the housing, the transmitted energy being perturbed by impingement upon the element and the perturbation of the energy varying with position of the element within the housing;

detecting energy from the first location including an unperturbed component and a superimposed component perturbed by the element;

generating a signal from the energy detecting step, the signal having an unperturbed component corresponding to the unperturbed component of the energy being detected from the first location and a perturbed component corresponding to the component of energy being detected which is perturbed by the element; and at least partially cancelling the unperturbed component of the signal corresponding to the unperturbed portion of the energy being detected from the first location.

16. The method of claim 15 wherein the partial cancelling step comprises the step of transmitting from a second location energy detectable with the first location energy and partially cancelling the unperturbed component of the first location energy being detected.

17. The method of claim 16 wherein the second transmitting step further comprises the step of adjusting a phase of the energy being transmitted from the second location to at least partially cancel the unperturbed component of the first location energy being detected.

18. The method of claim 16 wherein the second transmitting step further comprises the step of adjusting an amplitude of the energy being transmitted from the second location to at least partially cancel the unperturbed component of the first location energy being detected.

19. The method of claim 18 wherein the second transmitting step further comprises the step of adjusting a phase of the energy being transmitted from the second location such that the magnitude and phase adjustments of the energy from the second location essentially cancel all of the unperturbed component of the energy being detected from the first location.

20. The method of claim 19 wherein the second transmitting step further comprises transmitting energy from the second location through the housing to the element, the second location transmitted energy being perturbed by impingement upon the element and wherein the detecting step further comprises detecting at least some of the energy from the second location being perturbed by the element with the energy from the first location being perturbed by the element.

21. The method of claim 20 further comprising the step of adjusting the energy being transmitted from the second location such that the detected combined perturbed components of energy from the first and second locations is greater than the individual perturbed components from the first and second locations being detected.

22. The method of claim 16 wherein the second transmitting step further comprises transmitting energy from the second location through the housing to the element, the second location transmitted energy being perturbed by impingement upon the element and wherein the detecting step further comprises detecting at least some of the energy from the second location being perturbed by the element together with the energy from the first location being perturbed by the element.

23. The method of claim 22 further comprising the step of adjusting the energy being transmitted from the second location such that the combined detected perturbed components of energy from the first and second locations is greater than the individual perturbed components being detected from either of the first and second locations.

24. The method of claim 16 wherein the movable element is a valve at least partially formed from an electrically conductive material and wherein the transmitting steps further comprise the steps of generating alternating magnetic fields at the first and second locations.

25. The method of claim 16 wherein the element is a valve and is supported for movement on a movable support member and wherein at least one of the valve and the support member is formed from an electrically conductive material and wherein the transmitting steps further comprise the steps of generating alternating magnetic fields at the first and second locations.

26. A method of detecting from outside a housing the position of an electrically conductive element movably enclosed in the housing comprising the steps of:

generating an A.C. magnetic field outside the housing proximal to the housing and penetrating both the housing and the element from outside the housing; and simultaneously sensing outside the housing the A.C. magnetic field as perturbed by the electrically conductive element within the housing; and analyzing an instantaneous value of the sensed magnetic field to unambiguously differentiate from among at least three different instantaneous positions of the element.

27. The method of claim 26 wherein the generating step is performed at least essentially without disturbance of instantaneous position of the conductive element.

28. The method of claim 26 wherein the sensing step comprises sensing amplitude of the perturbed magnetic field and wherein the analyzing step comprises the steps of demodulating the amplitude of the sensed magnetic field and generating a first trace of the demodulated sensed magnetic field amplitude, the instantaneous value of the demodulated sensed magnetic field amplitude being related unambiguously to the instantaneous position of the element in the housing.

29. The method of claim 28 further comprising the step of comparing the first trace with a previously stored baseline magnetic field amplitude trace obtained for known positions of the movable element in the housing to relate instantaneous values of the sensed magnetic field amplitude of the first trace with position of the movable element within the housing.

30. The method of claim 28 wherein the sensing step further comprises the step of sensing phase of the perturbed magnetic field wherein the analyzing step further comprises the steps of demodulating the phase of the sensed magnetic field and generating a second trace of the demodulated, sensed magnetic field phase, the instantaneous value of the demodulated sensed magnetic field phase being related unambiguously to the instantaneous position of the element in the housing.

31. The method of claim 26 wherein the sensing step comprises the step of sensing phase of the perturbed magnetic field and wherein the analyzing step comprises the steps of demodulating the phase of the sensed magnetic field and generating a trace of the demodulated sensed magnetic field phase, the instantaneous value of the demodulated sensed magnetic field phase being related unambiguously to the instantaneous position of the element within the housing.

32. The method of claim 26 wherein the analyzing step comprises unambiguously differentiating among more than four different instantaneous positions of the valve element along the path within the valve housing.

* * * * *